Patented Mar. 29, 1949

2,465,375

UNITED STATES PATENT OFFICE 2,465,375

REFRACTORY AND METHOD OF PRODUCING THE SAME

Robert R. Hendren, Latrobe, Pa., assignor to McFeely Brick Company, Latrobe, Pa., a corporation of Pennsylvania No Drawing. Application October 20, 1947, Serial No. 781,016

4 Claims. (Cl. 25—157)

My invention relates to refractory masonry units, more particularly, those molded in the form of pipes, bricks, slabs and the like, and to a method of producing the same, and has reference to what are frequently referred to as special purpose refractories.

This case is a continuation-in-part of my copending application, Serial No. 592,286, filed May 5, 1945, entitled "Refractory and method of producing the same" and now abandoned.

In practice there has long existed a need for a refractory that will resist high temperatures, especially refractories for this purpose which will be commercially economical to use in quantity. Present refractories such as those formed of fire clay do not have sufficient strength or are melted when subjected to sustained high temperatures or excessive heat, are chemically attacked by gases, are eroded by slag, and do not withstand sudden drastic temperature changes. Moreover, slag attacks and fuses to them, requiring that the slag be burned off in some operations, by a high temperature torch, and damage results to such refractories in this operation.

It is recognized in the iron, steel and ceramic industry that common types of refractory shapes or masonry units which have thus far been developed for lining metal receiving and handling units, such as ladles, cupolas, spouts, runners and melting furnaces, have not satisfactorily solved the problems of chemical and metal erosion, slag attack, inclusion of impurities from refractories, etc., which must be overcome in order to efficiently and effectively handle molten iron, steel, other metals and glass. For instance, some of the well-known shortcomings or disadvantages of such common types of refractory shapes and masonry units which have been used to line the foregoing metal receiving and handling units are lack of thermal shock resistance at the elevated temperatures now required and employed in the production of iron, steel and other metals and glass; spalling, cracking and failure under ferrostatic loads, and failure to be readily freed from solidified metals and slags, all of which result in the early failure of the refractory, rendering the vessel or metal containing unit incapable of further service and making it necessary to replace the refractory lining prematurely. This tremendously increases the cost for materials and maintenance, thereby adding to and increasing the cost per ton of the finished iron, steel, other metals and glass.

I have long recognized these well known facts and have, therefore, conceived and developed a mixture and process resulting in refractory masonry units which will overcome the aforesaid objections and render service over long periods such as has thus far not been realized in the industry. The refractory masonry units embodying my invention have a very dense and well burned, vitrified ceramic structure with a nonwetting and substantially smooth surface devoid of small crevices or cracks, thereby being substantially impenetrable by molten metal, and are possessed of a high degree of heat (and electrical) conductivity which prevents development of "hot spots", extreme hardness, a softening temperature of at least 3000° F., and a very high resistance to oxidation so as to withstand direct contact with molten metal or glass without a protective coating or glaze as commonly required in the prior art.

In accordance with the present invention, I have produced refractory masonry units which, while comprising plastic, semi-flint and flint fire clays, in combination or separately, as the principal or predominant ingredients, are resistant to a remarkable degree, to conditions imposed upon the units in actual service, will withstand industrial steel manufacturing temperatures and will outlast, many times, the ordinary commercial fire clay refractory brick or masonry unit. This is accomplished by the use, with the fire clay in the refractory mix, of what is known in the art as amorphous graphite, namely, a form of graphite which is of an earthy nature and is non-crystalline when viewed by the naked eye or under a low power microscope. While flake or foliated graphite has heretofore been used for some special purposes, it has proven somewhat successful only where the product could be so formed as to bring the flakes or plate-like particles into overlapping relation. In its ultimate form, amorphous graphite has a dull earthy appearance and is comprised of extremely fine particles, which for the purposes of the present invention, are of such size that approximately all will pass through a No. 20 mesh screen and 40% thereof will pass through a No. 100 mesh screen, the ultimate particle size, therefore, being quite fine and small. Larger masses of amorphous graphite are easily crushed and reduced to a fine powdery condition. Rubbing the larger pieces detaches small particles so that the amorphous graphite spreads and coats, wets, enshrouds and, in many cases, actually impregnates surfaces which rub in contact with it. As will be seen hereinafter, the use of the amorphous form of graphite is largely responsible for the remarkable and revolutionary properties of the finished refractory brick or other masonry unit.

Natural graphite is divided into two well recognized distinct forms, namely, flake, and amorphous. This fact is recognized by leading authorities on the subject. The physical characteristics of graphite in either the flake or amorphous form are distinct. One has physical characteristics quite different from the other. Flake graphite is separated from its accompanying rock formations mechanically and cannot, by grinding or any other known method of subdivision, be reduced to an amorphous form, therefore, cannot be satisfactorily used for completely coating and impregnating clay particles as required in the present invention.

Amorphous graphite which is earth-like in appearance, is the critical ingredient in this composition and the key to my invention. Flake graphite, plumbago, kish and amorphous carbon are entirely unsuitable and cannot be used for the purposes of the present invention as shown and proven by exhaustive tests and experiments which I have conducted during the past six years, as follows:

I used flake graphite with fire clay alone, and with fire clay and grog, within the entire scale or ranges of composition as follows: from 6% to 52%, by weight, flake graphite; 22% to 92%, by weight, fire clay and the remainder of, by weight, grog. In each composition the ingredients were thoroughly mixed, in a dry state, after which water was introduced to the mixture to form the proper consistency. The mass was then formed into shapes which were dried and then fired, in a reducing atmosphere, to varying temperatures from 1800° F. to 2800° F. The results obtained were very unsatisfactory and the refractory shape was of little or no value for the reason that the clay and grog particles could not be properly coated and impregnated with the flake graphite. The structure was extremely porous, did not withstand shock and abrasion, and had wearing qualities similar to ordinary clay brick. Furthermore, there was excessive penetration by molten metal and glass. The slag adhered to the refractory shape and excessive oxidation continued after the molten metal was removed from the surface. As mentioned before, the structure of flake graphite cannot be broken down to an amorphous form by grinding or by any known method of subdivision, and the flakes align themselves in plate-like structures, which is desirable and advantageous for use in crucibles and similar objects, but detrimental when used in a refractory brick structure.

I used plumbago with fire clay alone, and with fire clay and grog, within the entire scale or ranges of composition as follows: from 6% to 52%, by weight, plumbago; 22% to 92%, by weight, fire clay and the remainder of, by weight, grog. In each composition the ingredients were thoroughly mixed, in a dry state, after which water was introduced to the mixture to obtain the proper consistency. The mass was then formed into shapes which were dried and then fired, in a reducing atmosphere, to varying temperatures from 1800° F. to 2800° F. The results obtained were very unsatisfactory, and the refractory shape was of little or no value for the reason that the clay and grog particles could not be properly coated and impregnated with plumbago. The shape or structure was extremely porous, did not withstand shock and abrasion and had wearing qualities similar to ordinary clay brick. Furthermore, there was excessive penetration by molten metal and glass. The slag adhered to the surface and excessive oxidation continued after the molten metal was removed from the surface.

I used kish, which is a free carbon, with fire clay alone, and with fire clay and grog, within the entire scale or ranges of composition as follows: from 6% to 52%, by weight, kish; 22% to 92%, by weight, fire clay, and the remainder, by weight, grog. Grog is a term commonly used in the ceramic art for clay which has been previously fired and then crushed, used brick being commonly employed for this purpose. Clay calcined to a brick-like state may be specifically prepared for use as grog and the terms "grog" and "calcined clay" are intended to cover either normal scrap materials used for the purpose, or such especially prepared material. In each composition the ingredients were thoroughly mixed, in a dry state, after which water was introduced to the mixture to obtain the proper consistency. The mass was then formed into shapes which were dried and then fired, in a reducing atmosphere, to varying temperatures from 1800° F. to 2800° F. The results obtained were completely unsatisfactory and the refractory shape was of no use or value for the reason that it was crumbly, punky, had excessive porosity permitting extreme penetration of molten metal or glass, did not withstand shock or abrasion—furthermore, slag adhered to the surface and excessive oxidation continued after the molten metal or glass was removed from the surface, and the shape continued to burn, thereby causing early failure of the installation.

I used amorphous carbon with fire clay alone, and with fire clay and grog, within the entire scale or ranges of composition as follows: from 6% to 52%, by weight, amorphous carbon; 22% to 92%, by weight, fire clay, and the remainder, by weight, grog. In each composition the ingredients were thoroughly mixed in a dry state, after which water was introduced to the mixture to obtain the proper consistency. The mass was then formed into shapes which were dried and then fired, in a reducing atmosphere, to varying temperatures from 1800° F. to 2800° F. The results obtained were completely unsatisfactory, and the refractory shape was of no use or value for the reason that as soon as it attained a temperature of 1400° F. or more, it continued to burn, in the presence of air, until all the carbon was oxidized into ash and the refractory shape remained as a shell or framework, only, having no refractory value.

During the past six years, I have conducted exhaustive experiments using amorphous graphite, with fire clay alone, and with fire clay and grog, within the entire scale or ranges of composition as follows: from 6% to 52%, by weight, armorphous graphite; 22% to 92%, by weight, fire clay, and the remainder, by weight, grog, as provided in accordance with the present invention. In each composition the ingredients were thoroughly mixed, in a dry state, after which water was introduced to the mixture to obtain the proper consistency. The mass was then formed into shapes which were dried and then fired, in a reducing atmosphere, to varying temperatures from 1800° F. to 2800° F. The results obtained were highly satisfactory and completely revolutionary in the art for the reason that the clay and grog particles were completely covered, enshrouded and impregnated with the amorphous graphite to form a protective coating. The refractory shape or structure had an extremely high density, little or no porosity, a nonwetting surface to which molten metal, glass, slag and similar molten materials would not adhere. It withstood the highest temperatures encountered in actual steel mill tests and usage. Molten metals and other molten materials could not penetrate the shape and there was no oxidation after the molten materials were removed from the surfaces. It withstood and resisted shock and abrasion and was vastly superior to any refractory heretofore produced and used.

I have found that by intimately mixing and commingling, preferably in a dry state, refractory particles of fire clay or fire clay and grog with amorphous graphite, the refractory particles become completely wetted, coated and enshrouded with a graphite film and even substantially impregnated with the amorphous graphite. This acts as an insulating medium or barrier against heat and gases that are detrimental to the refractory, and as an anti-wetting agent, so that slag, molten metal and glass will not attack the refractory and will not bond itself to the brick. The refractory masonry unit so made has a melting temperature substantially higher than ordinary fire clay refractory units. The exact softening temperature has not yet been determined but the brick has withstood the highest temperatures encountered in actual steel production and is known to be above 3000° F. I found that flake graphite does not completely wet, coat and enshroud the refractory particles and does not impregnate them, therefore, is of no value and cannot be used for the purposes of the invention.

Generally, in the practice of my invention, a cement for securing the refractory masonry units in place comprises fire clay and amorphous graphite, and for refractory masonry units or shapes, plastic, semi-flint and flint fire clay, grog and amorphous graphite are employed. A typical cement is one having 30% amorphous graphite and 70% clay, although other percentages may likewise be used with success.

For making refractory articles, such as bricks, good results are also obtained when the amorphous graphite is present in the range from around 6% to around 52%, by weight, clay in the range between 22% to 92%, by weight, and grog if used, in an amount to make up the difference.

A typical amorphous graphite is one sold by the United States Graphite Company, it being of Mexican origin. This quality will all pass an 8 mesh screen, practically all of it, through a 16 mesh screen, and a large percentage through a 100 mesh or finer. The mesh is important to the extent that it affects the time required in mixing and affords complete coating of the clay particles, but due to the soft, fragile, earthy nature and character of the particles and their ready disintegration in subsequent mixing with the clay, wide tolerances are permitted.

A combination of good quality plastic, semi-flint and flint fire clays found suitable for my invention, but to which the invention is not restricted, has a composition of 55% to 65% silica and 17% to 30% alumina. All materials are properly graded and processed and contain impalpable powder so that the percentage of voids will not exceed 40%. A satisfactory grog is one in which 90% passes through a standard 8 mesh screen or 80% passes through a standard 16 mesh screen.

I have heretofore enumerated particular materials, mesh sizes and compositions in order that my invention may be readily and satisfactorily practiced. Proportions, grain sizes and compositions indicated are typical, but within the skill of the ceramic engineer, may be varied to meet critical needs or commercial requirements. One typical mix found satisfactory in making refractory masonry units which have withstood industrial steel manufacturing temperatures and have outlasted, many times, the ordinary commercial fire clay brick, is as follows:

| | |
|---|---:|
| Plastic, semi-flint, and flint fire clay in combination with any two or three used in any desired ratio or used separately _____pounds__ | 80 |
| Grog _____do____ | 80 |
| Amorphous graphite_____do____ | 40 |
| Water _____gallons__ | 3 to 4½ |

Expressed in percentages, by weight, the solid ingredients are 40% clay, 40% grog, and 20% amorphous graphite.

In the preparation of my refractory masonry units, the solid ingredients are intimately commingled and mixed in a dry state until the fire clay or fire clay and grog particles become completely coated, enshrouded and substantially impregnated with the amorphous graphite. Then water is added while the commingling and mixing is continued until a workable mix or mass is produced. The said mix or mass is then formed into the required shapes for refractory masonry units by any conventional forming process used in the refractory industry, "wet mud," "stiff mud," or "dry pressing." The formed refractory masonry unit must then be dried until at least 80% of the added water has been removed.

After the refractory masonry unit has been formed and dried, it must be fired in a reducing atmosphere to a temperature range of from 1800° F. to 2800° F. for from 5 to 12 days. This firing in a reducing atmosphere to a temperature of not less than 1800° F. for a period of from 5 to 12 days is critical to my invention.

Refractory masonry units produced in accordance with the teachings of my invention have been successfully used in furnaces, runners, spouts, ladles, mold plugs, kilns, heat treating equipment and cupolas. In the lip of a pouring ladle, the best commercial fire clay bricks tested had an average life of 10 days, whereas, bricks made under my invention have been used more than 2 months in the same location with no apparent injury to the brick. Slag which freezes in the ladle does not fuse to or attack the brick produced according to my invention, but may be knocked loose with a crowbar leaving the brick smooth and unimpaired. It would be expected that in this position rapid disintegration would occur, due to oxidation of the amorphous graphite, but, oddly, this does not happen. The molten metal, like the slag, does not attack or wet the brick and excludes air from contact with the refractory. That the molten metal does not wet or dissolve the amorphous graphite when used with fire clay is a most unexpected phenomenon in view of the ready solubility of carbon and graphite under normal conditions in ferrous baths.

The refractory masonry unit, after firing, has a very dense structure with a nonwetting and substantially smooth surface devoid of small crevices and cracks, is possessed of a high degree of heat and electrical conductivity; it is a vitrified ceramic mass and although very hard, it may be easily scratched by a sharp implement, even after it has been used for a period of time; it is highly resistant to sudden drastic temperature changes, thermal shock, chemical attack by slag and metals at elevated temperatures, spalling, cracking and failure under ferro static loads; it has a softening temperature of at least 3000° F., will withstand current industrial steel manufacturing temperatures and has a very high resistance to oxidation so as to withstand direct contact with molten metal or glass without the necessity of a protective surface or glaze taught by prior art. It has been found upon inspection of the refractory that the amorphous graphite not only wets, coats and enshrouds the refractory particles, but actually penetrates and impregnates the grains so that the heat resistant character of the refractory is not dependent upon surface coating, but, by virtue of such impregnation, extends into and actually through the fire clay and grog particles.

It will be understood that I have described specifically certain embodiments of my invention, but various modifications may be made therein with changes of procedure and material to suit particular circumstances.

I claim:

1. A vitrified refractory masonry unit comprising refractory particles of fire clay, coated, enshrouded, and impregnated with amorphous graphite, the fire clay making up from substantially 22% to 92%, by weight, and the amorphous graphite making up from substantially 52% to 6%, by weight, respectively, said unit having a very dense structure with a non-wetting and substantially smooth surface devoid of small crevices or cracks, and possessed of a high degree of heat and electrical conductivity, a softening temperature of at least 3,000° F., and a very high resistance to oxidation so as to withstand direct contact with molten metal or glass.

2. A refractory masonry unit comprising vitrified refractory particles of fire clay and grog in intimate mixture and bonded together, said particles being completely coated, enshrouded, and impregnated with amorphous graphite, the fire clay making up from substantially 22% to 92% by weight, the amorphous graphite making up from substantially 52% to 6%, by weight, respectively, and the remainder being grog, said unit having a very dense structure with a non-wetting and substantially smooth surface devoid of small crevices or cracks, possessed of a high degree of heat and electrical conductivity, a softening temperature of at least 3,000° F., and a very high resistance to oxidation so as to withstand direct contact with molten metal or glass.

3. The method of making a vitrified refractory masonry unit which consists of intimately commingling and mixing particles of fire clay and amorphous graphite only; in a dry state until the amorphous graphite completely coats and enshrouds the particles of fire clay, wherein the fire clay consists of from 22% to 92% by weight, and the amorphous graphite consists of from 52% to 6%, by weight, respectively, adding water and continuing commingling, and mixing until a workable mix or mass is produced, forming said mix or mass into shapes, drying the formed shapes until at least 80% of the added water has been removed and then firing them in a reducing atmosphere at a temperature of from 1800° F. to 2800° F. until vitrification of the unit is obtained.

4. The method of making a vitrified refractory masonry unit which consists of intimately commingling and mixing particles of fire clay, grog, and amorphous graphite only; in a dry state until the amorphous graphite completely coats and enshrouds the particles of fire clay, wherein the fire clay consists of from 22% to 92% by weight, and the amorphous graphite consists of from 52% to 6%, by weight, respectively, the remainder being grog, adding water and continuing commingling, and mixing until a workable mix or mass is produced, forming said mix or mass into shapes, drying the formed shapes until at least 80% of the added water has been removed and then firing them in a reducing atmosphere at a temperature of from 1800° F. to 2800° F. until vitrification of the unit is obtained.

ROBERT R. HENDREN.

REFERENCES CITED

The following references are of record in the file of this patent:

UNITED STATES PATENTS

| Number | Name | Date |
|---|---|---|
| 192,398 | Wile | June 26, 1877 |
| 253,748 | Nehring | Feb. 14, 1882 |
| 1,249,960 | Hollingsworth | Dec. 11, 1917 |
| 1,374,909 | De Bats | Apr. 19, 1921 |
| 1,503,150 | Brockbank | July 29, 1924 |
| 1,802,776 | Pence | Apr. 28, 1931 |
| 1,849,289 | Forse et al. | Mar. 15, 1932 |
| 1,891,979 | Hanauer | Dec. 27, 1932 |
| 2,057,349 | Rentschler | Oct. 13, 1936 |

OTHER REFERENCES

Spence, "Graphite," Mines Branch, Canadian Dep't. of Mines (1920), pages 16, 64, 119, 123, 127, 131, and 132.

Ryschkewitsch, "Graphit" (1926), pages 249, 250, 255, and 256.

Ceramic Abstracts, vol. 8, page 119 (1929), "Graphite in 1927."